(12) United States Patent  
Morikuni et al.

(10) Patent No.: US 8,437,802 B2
(45) Date of Patent: *May 7, 2013

(54) METHODS AND SYSTEMS FOR IDENTITY MANAGEMENT IN WIRELESS DEVICES

(75) Inventors: James J. Morikuni, Itasca, IL (US); Bashar Jano, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,904

(22) Filed: Jan. 30, 2012

(65) Prior Publication Data

US 2012/0129498 A1 May 24, 2012

Related U.S. Application Data

(63) Continuation of application No. 11/830,394, filed on Jul. 30, 2007.

(51) Int. Cl.
*H04B 1/38* (2006.01)

(52) U.S. Cl.
USPC ........... 455/558; 455/410; 455/411; 455/418; 455/419; 455/550.1; 713/161; 713/169; 713/170; 713/176; 713/184; 380/247; 380/248; 380/249; 380/250; 380/270; 709/202; 709/213; 709/214; 709/217; 709/218

(58) Field of Classification Search ............... 455/432.3, 455/435.1, 410, 411, 418, 419, 420, 550.1, 455/558; 713/161, 169, 170, 171, 172, 173, 713/176, 184; 709/202, 213, 214, 217, 218; 380/247, 248, 249, 250, 270
See application file for complete search history.

(56) References Cited

U.S. PATENT DOCUMENTS

| | | | |
|---|---|---|---|
| 5,604,787 A | 2/1997 | Kotzin et al. | |
| 6,041,229 A | 3/2000 | Turner | |
| 6,466,804 B1 | 10/2002 | Pecen et al. | |
| 6,487,219 B1 | 11/2002 | Snider | |
| 6,868,282 B2 | 3/2005 | Carlsson | |
| 7,450,965 B2 | 11/2008 | Kim | |
| 7,502,628 B2 | 3/2009 | Imaeda | |
| 7,570,756 B2 | 8/2009 | Park et al. | |
| 7,603,107 B2 | 10/2009 | Ratert et al. | |
| 7,623,852 B2 | 11/2009 | Gnuschke | |
| 7,729,725 B2 * | 6/2010 | Stenmark | 455/558 |
| 7,747,861 B2 | 6/2010 | Mishra et al. | |
| 7,877,112 B2 * | 1/2011 | Lan et al. | 455/558 |
| 2002/0147926 A1 | 10/2002 | Pecen et al. | |

(Continued)

OTHER PUBLICATIONS

"Technical Report; 3rd Generation Partnership Project;", 3GPP TR 33.817 V6.1.0 (Dec. 2004).

(Continued)

*Primary Examiner* — Olumide T Ajibade Akonai

(57) ABSTRACT

Methods and devices for allowing a wireless communication device (1301) initially unauthorized for communication with a network to obtain persistent soft network subscription credential information (1303) from a wireless communication device (1401) initially authorized for communication with the network are disclosed. In performing the persistent transfer of the soft network subscription credential information (1303), one of a token management module (1312), a session initiation protocol communication module (1408), or a electronic rights manager (1406) may be used to ensure that only one communication device is capable of communicating with a network at any one time.

35 Claims, 14 Drawing Sheets

U.S. PATENT DOCUMENTS

| | | |
|---|---|---|
| 2003/0190908 A1 | 10/2003 | Craven |
| 2004/0180657 A1 | 9/2004 | Yaqub et al. |
| 2005/0070248 A1 | 3/2005 | Gaur |
| 2005/0149740 A1 | 7/2005 | Kotzin et al. |
| 2005/0266883 A1 | 12/2005 | Chatrath |
| 2006/0009214 A1 | 1/2006 | Cardina et al. |
| 2006/0183500 A1 | 8/2006 | Choi |
| 2007/0004457 A1 | 1/2007 | Han |
| 2008/0261561 A1 | 10/2008 | Gehrmann |

OTHER PUBLICATIONS

Toepfer, Armin "WID Personal Network Management", TSG-SA WG1 #29 S1-050620; Povoa de Varzim, Portugal, Jul. 11-15, 2005; *Agenda Item: 8.1 Title: WID Personal Network Management; Source: PNM Rapporteur* ; Contact: Armin Toepfer, Vodafone, armin.toepfer@vodafone.com.

"Non-Final Office Action", U.S. Appl. No. 11/830,394, filed Jul. 30, 2007; mailed Sep. 16, 2010.

"Non-Final Office Action", U.S. Appl. No. 11/830,394, filed Jul. 30, 2007, mailed Feb. 23, 2011.

"Notice of Allowance", U.S. Appl. No. 11/830,394, filed Jul. 30, 2007; Mailed Feb. 3, 2012.

United States Patent and Trademark Office, "Non-Final Rejection" for U.S. Appl. No. 11/830,394, dated Feb. 23, 2011, 15 pages.

* cited by examiner

METHODS AND SYSTEMS FOR IDENTITY MANAGEMENT IN WIRELESS DEVICES

CROSS REFERENCE TO PRIOR APPLICATIONS

This application is a continuation of U.S. Ser. No. 11/830,394, filed Jul. 30, 2007, entitled "Methods and Systems for Identity Management in Wireless Devices," which is incorporated by reference for all purposes.

BACKGROUND

1. Technical Field

This invention relates generally to methods and systems for identity management in wireless mobile devices, and more particularly to a method and system for electronically transferring a subscription credential from one device to another, thereby authorizing a previously unauthorized communication device to become authorized for communication with a network.

2. Background Art

Mobile telephones have become commonplace in today's society. Whereas a few years ago mobile telephones were large and bulky, they have now become small, sleek, and multifunctional. In the development of mobile telephone communication, a succession of standards has been used to control how communication is facilitated. One of the more common standards used today is Global System for Mobile Communications (GSM). GSM devices are used by millions of people across more than 200 countries and territories.

One of the key features of GSM systems is the Subscriber Identity Module (SIM), commonly employed through a SIM card. The SIM card is a detachable smart card housed in a mobile telephone which contains the user's subscription information and information related to network security. Specifically, in relation to security, the SIM card contains a unique set of security keys that enables a subscriber in possession of the SIM card to communicate with their subscribed communication provider.

Technology associated with SIM authentication as been evolving in recent years. One implementation of SIM authentication and security used in prior art systems is as follows: After a mobile device has been powered on, the device reads information from the SIM card and transmits a unique International Mobile Subscriber Identity (IMSI) to a Mobile Communication Provider requesting access and authentication. The Mobile Communication Provider searches its database for the incoming IMSI and its associated Security Key. If the IMSI and Security Key are found, the Mobile Communication Provider then allows the mobile device to access the Mobile Communication Provider's network and begin communicating.

Each SIM card contains a unique IMSI that is registered with a service provider. Each IMSI is associated with a single user and a single mobile device. This singular association between a SIM card and a user has worked very well because traditionally, a user has had only one mobile telephone. User's may use multiple communication devices. Each device may be bound to the same identity. For example, a user may want the full functionality of a smart phone while he is at work, but would like a smaller, more stylish phone for use during personal time. Similarly, he may like to use an ultra-compact phone while exercising but may prefer a more feature rich phone when traveling.

Unfortunately, as described above, a mobile user's subscription is tied to a single SIM card which must be physically inserted into a mobile telephone for it to work. It is not possible for a single user to have multiple SIM cards for the same service subscription at the same time, unless the user physically transfers the SIM card from one device to another.

Turning to FIG. 1 (Prior Art), illustrated therein is one embodiment of a set of prior art devices belonging to a mobile user. The set of prior art mobile devices comprises a first prior art phone 100 having a hard SIM card 102 and a second prior art phone 101 not having a hard SIM card. The first prior art phone 100 and the second prior art phone 101 each comprise a hard SIM card holder 103, a transmitter 104, and a receiver 105 for implementing communications with a mobile communication provider. Additionally, each has a controller 107, a user interface 109, and a hard SIM card reader 111. The interaction of such components can be found, for example, in U.S. Pat. No. 6,868,282 and US Published Application No. 2004/0180657.

FIG. 1 illustrates one example of the problem discussed above concerning having two mobile devices and only one hard SIM card. First prior art phone 100, with the SIM card 102 inserted therein, is able to access a mobile communication provider's network while the second prior art phone 101, lacking a hard SIM card, is unable to access the network. If, for example, a user wishes to communicate using the second prior art phone 101, the user must physically remove the hard SIM card 102 from the first prior art phone 100 and insert it into the hard SIM card holder 103 housed within the second prior art phone 101.

Unfortunately, this process of removing a hard SIM card from a first phone and placing it in a second phone is not easy for the average user. Even for an experienced user, removal of the hard SIM card from one phone and placement of the hard SIM in another phone is inconvenient since the hard SIM card is usually located inside the phone housing behind the battery. Not only is it cumbersome to disassemble the phone, but it may also expose both the hard SIM card and the phone to damage or loss.

There is thus a need for a method and apparatus that allows a user with a single network subscription to be able to use multiple phones without having to transfer a hard SIM card between devices.

BRIEF DESCRIPTION OF THE DRAWINGS

The accompanying figures, wherein like-referenced numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
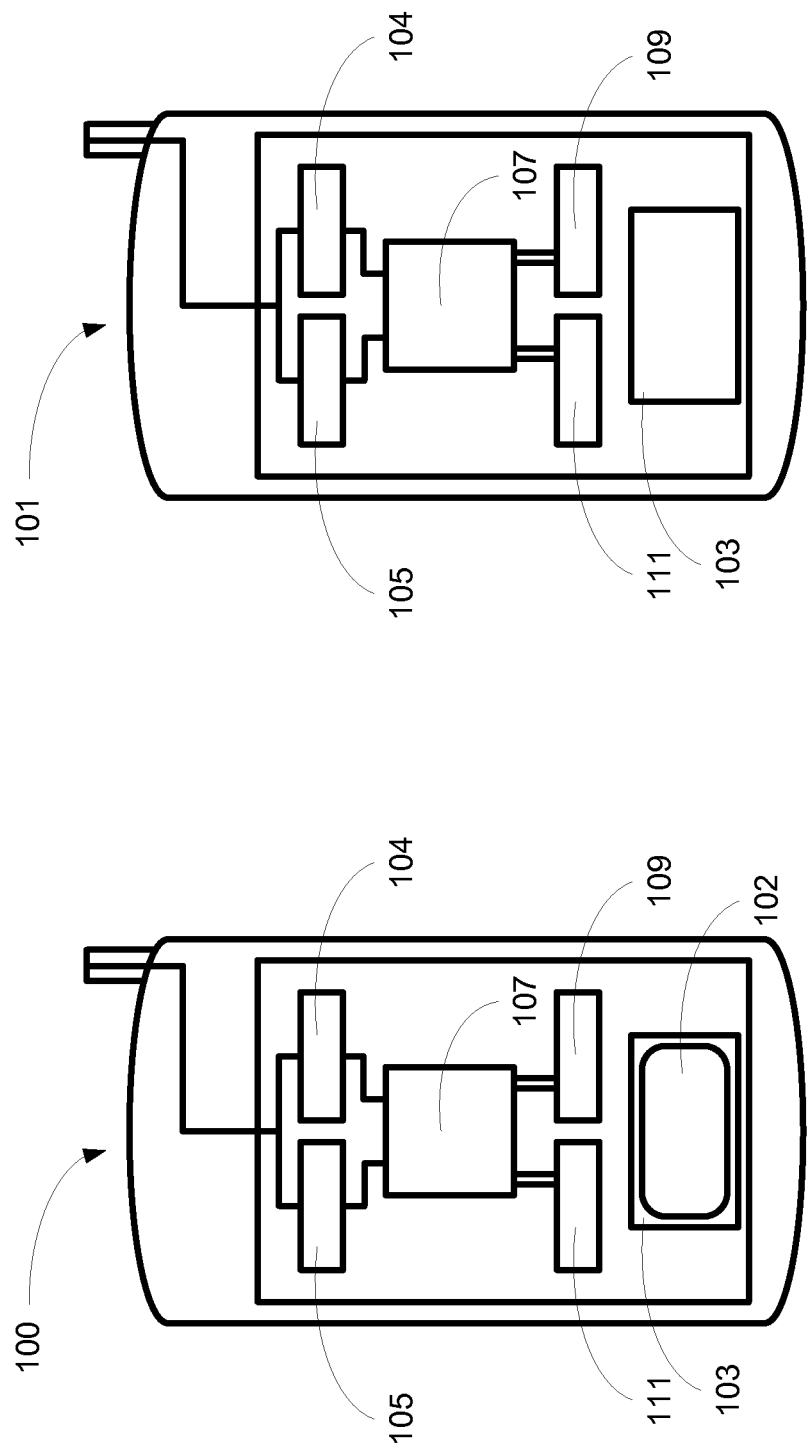
FIG. 1 illustrates a pair of prior art mobile devices, one having a SIM card and the other without.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to methods and systems for seamless SIM-based identity management in wireless mobile devices. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description therein.

It will be appreciated that embodiments of the invention described therein may be comprised of one or more conventional processors and unique stored program instructions that control the one or more processors to implement, in conjunction with certain non-processor circuits, some, most, or all of the functions of methods and systems for seamless SIM-based identity management in wireless mobile devices described therein. The non-processor circuits may include, but are not limited to, a radio receiver, a radio transmitter, signal drivers, clock circuits, power source circuits, and user input devices. As such, these functions may be interpreted as steps of a method to perform methods and systems for seamless SIM-based identity management in wireless mobile devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described therein. Further, it is expected that one of ordinary skill, notwithstanding possibly significant effort and many design choices motivated by, for example, available time, current technology, and economic considerations, when guided by the concepts and principles disclosed therein will be readily capable of generating such software instructions and programs with minimal experimentation.

Embodiments of the invention are now described in detail. Referring to the drawings, like numbers indicate like parts throughout the views. Further, the dashed lines utilized by the flow charts illustrating embodiments of the method claims may indicate possible or optional paths which the embodiments of the invention may take. As used in the description therein and throughout the claims, the following terms take the meanings explicitly associated therein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown therein in parenthesis indicate components shown in a figure other than the one in discussion. For example, talking about a device (10) while discussing figure A would refer to an element, 10, shown in figure other than figure A.

This invention generally relates to methods and devices configured to transfer soft network subscription credentials from one mobile wireless device to another without the need to physically remove a hard SIM card. The invention thus allows a user to electronically switch from one wireless communication device to another without having to make hardware adjustments. Thus, a user may electronically activate a personal mobile telephone, and deactivate a business mobile telephone, electronically, without having to pull the SIM card from one device and insert it into the other.

While the user may have a SIM card, the invention may be employed with or without hard SIM cards. For example, in one embodiment a user may have a single SIM card and multiple mobile devices. In another embodiment, the user may have no SIM card, yet still may use multiple mobile devices. In yet another embodiment, identical SIM cards may exist in multiple devices. In each of the embodiments, however, only one mobile device is "authorized" to be in active communication with a network at a given time.

Figure 2:
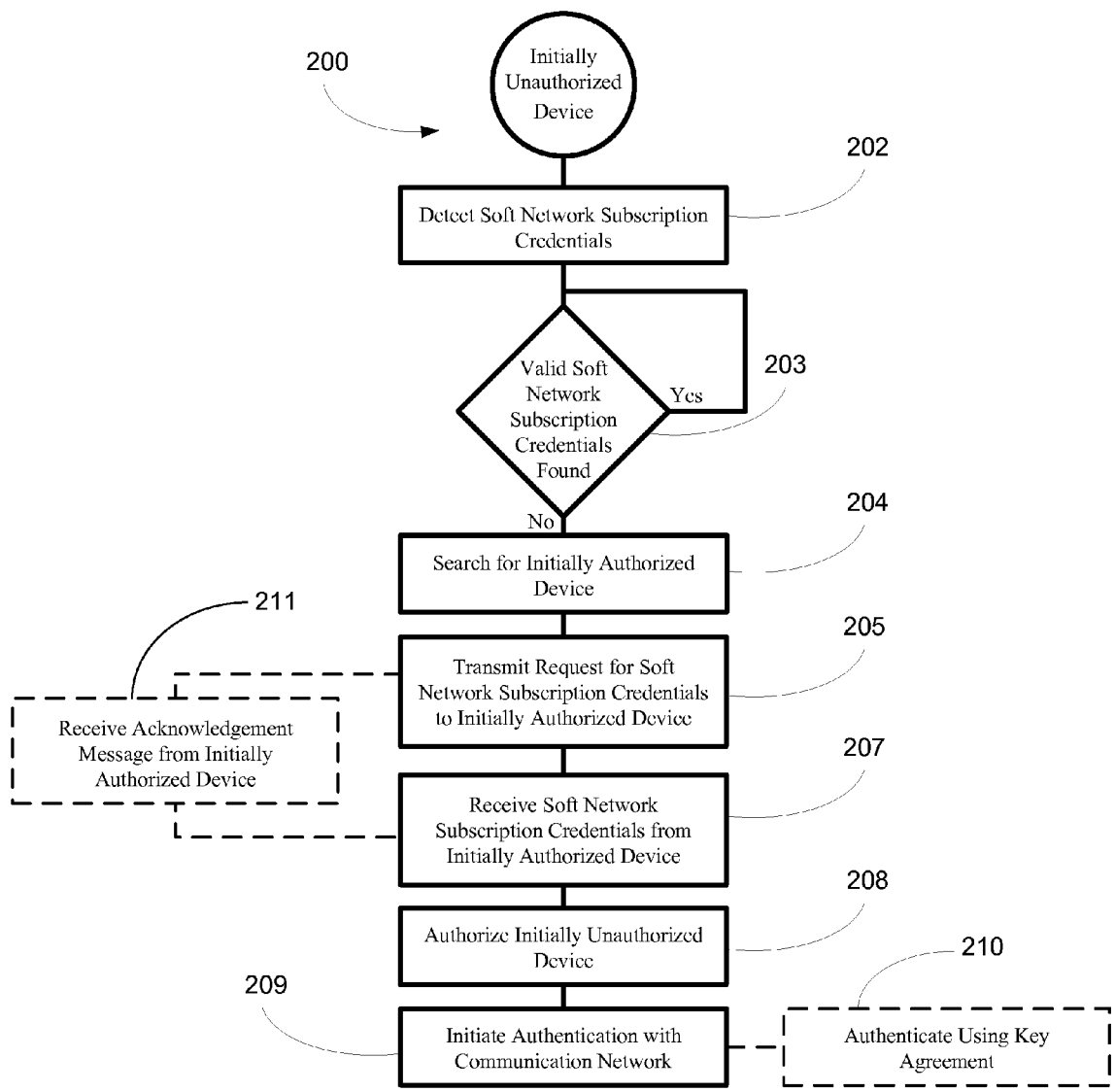
FIG. 2 illustrates one embodiment of a method for a wireless communication device initially unauthorized for communication with a network to obtain persistent soft network subscription credentials from a wireless communication device initially authorized for communication with the network in accordance with embodiments of the invention.

Turning now to FIG. 2, illustrated therein is one embodiment of a method 200 for a wireless communication device initially unauthorized for communication with a network, referred to herein as the "initially unauthorized device," to obtain persistent soft network subscription credentials. The initially unauthorized device obtains these persistent soft network subscription credentials from a wireless communication device initially authorized for communication with the network, referred to herein as the "initially authorized device." Either the initially authorized device of the initially unauthorized device may be a mobile telephone, a personal digital assistant, portable media device, or other portable wireless communication device. Regarding the soft network subscription credentials, the term "soft" will be used therein to describe data storable in electronic media. For example, soft network subscription credentials are capable of being electronically stored and electronically transferred, in contrast to a hard SIM card, which must be physically removed from one device and placed in another device.

The networks described herein are communication networks that permit only authorized users to communicate with the communication network. Such communication networks may include GSM networks, CDMA networks, TDMA networks, iDEN networks, WiMAX networks and UMTS networks, public land mobile networks (PLMN), public switched telephone networks (PSTN), 3G communication networks, wireless local area networks (WLAN), personal area networks (PAN) such as Bluetooth, ad-hoc networks, sensor networks, and other communication and data networks.

When the method begins, the initially unauthorized device may be OFF. The initially unauthorized device may also be in other states as well. For instance, the initially unauthorized device may be ON, or in a hibernation, idle, or listening state. Similarly, the initially authorized device may initially be ON, but may alternatively be in a hibernation, idle, or listening state. Embodiments of the invention may be effected regardless of the initial state of each device.

At step 202, the initially unauthorized device detects the absence of soft network subscription credentials. In one embodiment, the initially unauthorized device detects the absence of soft network subscription credentials when the device is powered ON from the OFF state. For example, when a mobile telephone is turned ON, it may automatically detect the absence of soft network credentials as part of its startup process. In one embodiment, the initially unauthorized device detects the absence of soft network subscription credentials when the device returns active from a hibernation, idle, or listening state.

When an initially authorized device deactivates its authentication, the device may enter a hibernation, idle, or listening state, as it is no longer capable of communicating with the network. Upon returning from the hibernation, idle or listening state, the device may automatically detect the absence of soft network subscription credentials. In one embodiment, the detecting of the absence of soft network subscription credentials may occur following a user's actuation of the user interface.

In one embodiment, the soft network subscription credentials are stored in a storage module within each of the wireless communication devices. A soft network subscription credential detection device then detects the presence, or lack thereof, of soft network subscription credentials. The absence of soft network subscription credentials indicates that the communication device is indeed unable to communicate with the network. If soft network subscription credentials are found, the device is authorized for communication with the network. This process is illustrated in FIG. 2, at step 203, when the soft network subscription detection device detects that the initially unauthorized device lacks soft network subscription credentials and is thus unable to communicate with the network.

Figure 3:
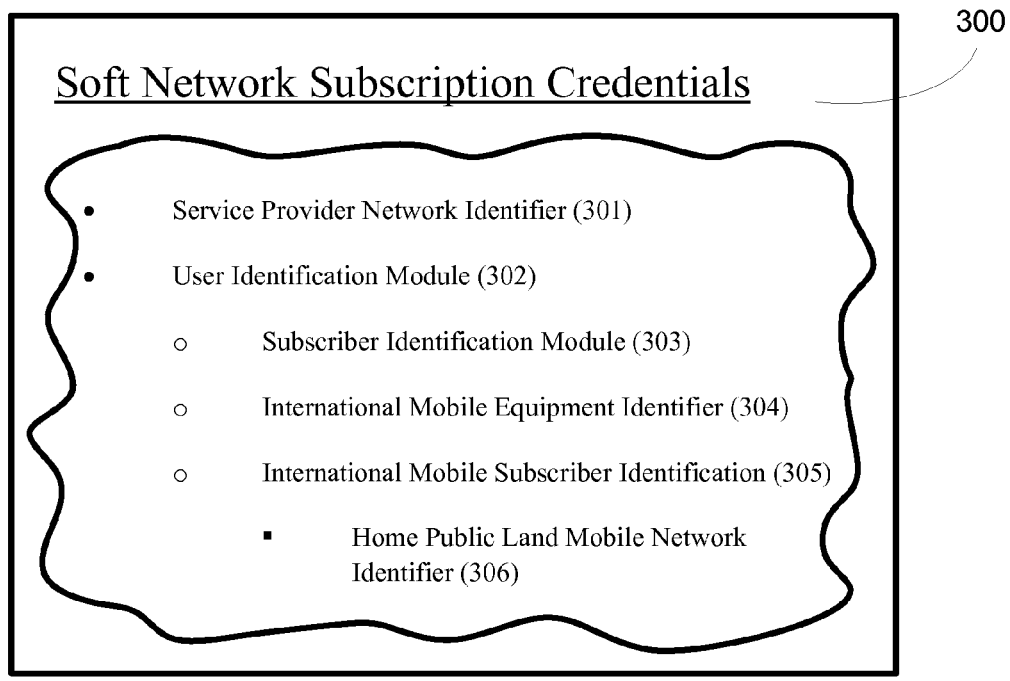
FIG. 3 illustrates one embodiment of soft network subscription credentials in accordance with the invention.

Turning briefly to FIG. 3, illustrated therein is one embodiment of the soft network subscription credentials 300. The soft network subscription credentials 300 contain data needed to permit a wireless communication device to access a network. In one embodiment, the soft network subscription credentials 300 comprise a service provider network identifier 301. The service provider network identifier 301 may contain information capable of identifying a network associated with a service provider.

For example, where a plurality of service providers each provide their respective subscribers with communications network access in one particular area, each provider may employ a means for restricting access to their respective networks by non-subscribers. A user subscribing to a first service provider's network is given a mobile communication device with a first service provider network identifier capable of accessing the first service provider's communication network. This first service provider network identifier may, for example, be a network key required to enable the wireless communication device to access the network. Additionally, a second service provider's network, in the same area, may use a second service provider network identifier to prevent the user subscribing to the first service provider's network from accessing the second service provider's network.

In one embodiment, the soft network subscription credentials 300 comprise a user identification module 302. The user identification module 302 includes information capable of identifying a user. This information may include the subscriber's personal and preferential information, security keys, media type, and international identification data. In one embodiment, the user identification module may include a SIM 303. The SIM 303, known in the art, may comprise data associated with user's name, address, telephone number, email address, telephone subscription plan, lists of telephone numbers, ring tones, wallpaper pictures, and phone appearance configurations. The SIM 303 may further comprise an international circuit card ID, an international mobile subscriber identity, an authentication key, data storage capabilities and a location area identity.

The user identification module 302 may further comprise a variety of identifiers used to associate a user with a service provider. The following identifiers, along with the SIM 303 described above, may be presented in singular form or in combination. First, an International Mobile Equipment Identifier (IMEI) 304 may be used. The IMEI 304, known to those of ordinary skill in the art, is a number unique to every GSM and Universal Mobile Telecommunications System (UMTS) mobile phone. The IMEI 304 is used to identify the device, and has no relation to the subscriber. For example, if a communication device is stolen, the owner can call his or her network provider and instruct them to "ban" the communication device from using its IMEI number. This renders the communication device useless, regardless of whether the device's SIM has been changed.

Next, an International Mobile Subscriber Identification (IMSI) 305 may be used. The IMSI 305, known to those of ordinary skill in the art, is a unique number that is associated with all GSM and UMTS network mobile phone users. The IMSI may be used to identify the network to which the IMSI belongs, and whether subscribers to service of that network are allowed to use a different network. The IMSI may include a mobile country code, a mobile network code, and a mobile subscriber identification number. In one embodiment, the IMSI 305 may further comprise a home public land mobile network identifier 306. The home public land mobile network identifier 306 may identify the user's home network, as opposed to networks outside the user's home coverage area. Such a system can stand alone, but often it is interconnected with a fixed system such as the public switched telephone network. While a public land mobile network user is generally a person with a mobile telephone, in other embodiments of the invention, the public land mobile network user may also use a computer, personal digital assistant, or other device to communicate with the network.

Turning back to FIG. 2, upon detecting the absence of the soft network subscription credentials, at step 204 the initially unauthorized device begins electronically searching for the initially authorized device. The methods for electronically searching for devices include Bluetooth, ZigBee, Universal Plug and Play, WiFi, radio frequency searching, and other known methods. For example, the 2.4 GHz frequency might be searched if the wireless devices are configured to communicate with the IEEE 802.11g communication standard. In another embodiment, the initially authorized device may actively transmit local area network messages while the initially unauthorized device passively listens for such messages. The messages transmitted by the initially authorized device may contain the initially authorized device's address, identification number, or other data.

While the initially unauthorized device searches for the initially authorized device upon detecting a lack of soft network subscription credentials, it will be clear to those of ordinary skill in the art having the benefit of this disclosure that the invention is not so limited. In another embodiment, the initially authorized device may search for the initially unauthorized device. For example, the user may want to switch from the initially authorized device to the initially unauthorized device. In such a scenario, the user may initiate a search for the initially unauthorized device from the initially authorized device.

Once the initially unauthorized device has found the initially authorized device, or vice versa as the case may be, the initially unauthorized device begins communicating with the initially authorized device across a local area network. At step 205, the initially unauthorized device initiates a request for a persistent transfer of the soft network subscription credentials by transmitting an activation request to the initially authorized device. The term "persistent" as used herein in refers to a transfer that is immutable until actively reversed. In other words, when a persistent transfer occurs between devices, the receiving device will retain the received data until it actively transmits the data away. The transfer remains regardless of communication state, proximity, or power state of the devices. The activation request may be a single packet of data or a stream of packets. The activation request informs the initially authorized device of the initially unauthorized device's request for the persistent transfer of soft network subscription credentials.

The initially unauthorized device receives an acknowledgement message from the initially authorized device at step 211. This acknowledgement message is optional, and indicates that the initially authorized device received the activation request. The acknowledgement message acts to ensure that the activation request has been processed successfully.

Figure 4:
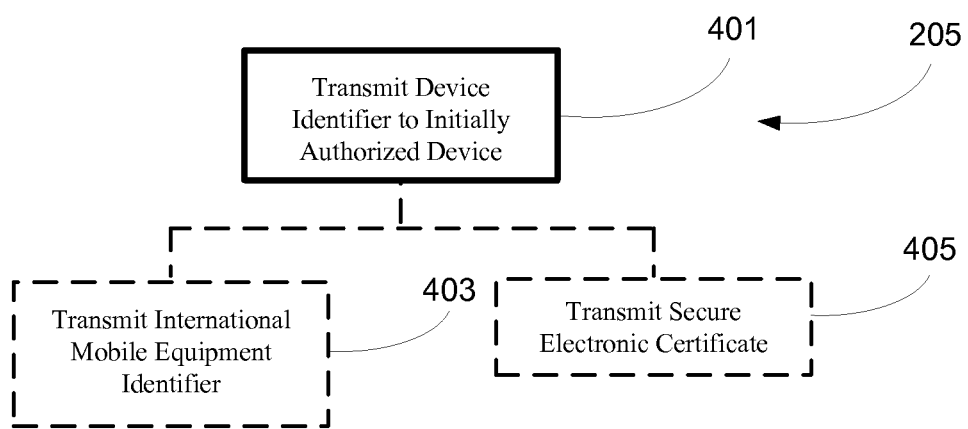
FIG. 4 illustrates one embodiment of a device initially unauthorized for communication with the network transmitting an activation request to a device initially authorized for communication with a network.

Turning briefly to FIG. 4, illustrated therein is one embodiment of a method for accomplishing the transmission of the activation request from the initially unauthorized device to the initially authorized device (i.e., one method of accomplishing step 205 of FIG. 2). In the method of FIG. 4, illustrated by step 401, the activation request includes hardware dependent information, such as a device identifier. The device identifier is associated with, and thus identifies, the initially unauthorized device to the initially authorized device.

Transmitting the device identifier (or other equivalent identification information) to the initially authorized device may additionally provide an authentication function for the initially authorized device. For instance, the device identifier may confirm that the initially unauthorized device is authorized to receive soft network subscription credentials. In one embodiment, the initially authorized device contains a database of identification information corresponding to devices and subscribers which are authorized to be sent soft network subscription credentials. If the initially authorized device receives a request for a persistent transfer of the soft network subscription credentials and receives a device identifier that is not recognized, the initially authorized device may reject the request.

The device identifier, as described above, may be, but is not limited to, a unique identifier associated with the physical wireless communication device or a unique identifier associated with a subscriber to a communication provider. In addition to transmitting a device identifier, the initially unauthorized device may also transmit additional data to provide further identifying information to the initially authorized device. In one embodiment, illustrated at step 403, the initially unauthorized device transmits an IMEI to the initially authorized device. In another embodiment, illustrated at step 405, the initially unauthorized device transmits a secure electronic digital certificate to the initially authorized device. The secure electronic digital certificate, in one embodiment, is an electronic document incorporating a digital signature to bind together a public key with identity information such as the name of a person or an organization, an address, and so forth.

Returning now to FIG. 2, upon receiving a request for a persistent transfer of the soft network subscription credentials, the initially authorized device prepares to deactivate its communication authorization with the network. The deactivation of communication authorization is necessary to prevent multiple wireless communication devices from communicating with the same network subscription credentials. Such a situation causes logistical problems in the network routing algorithms.

Once the initially authorized device has fully deactivated its communication authorization with the network, it actively transmits the soft network subscription credentials to the initially authorized device. At step 207, the initially unauthorized device receives the soft network subscription credentials from the initially authorized device and persistently stores them in a memory. At step 208, upon the initially unauthorized device receiving the soft network subscription credentials, the initially unauthorized device becomes authorized for communication with the network.

In an alternate embodiment the initially authorized device may transfer the soft network subscription credentials through a multi-device communication. The initially authorized device may be in communication with both the network and the initially unauthorized device. A three way handshake facilitates such a communication. Once the transfer of the soft network subscription credentials occurs, the initially authorized device receives an acknowledgement from the network that the soft network subscription credentials have been transferred and installed in the initially unauthorized device. The initially authorized device then deactivates communication and directs the initially unauthorized device to initiate communication with the network. The initially authorized device then waits for an acknowledgement that the initially unauthorized device's communication with the network has been successful and sends a final acknowledgement. If any of the messages are lost, then the system reverts back to it's original state.

Note that the soft network subscription credentials received by the initially unauthorized device may not be the exactly the same as the soft network subscription credentials possessed by the initially authorized device. In one embodiment, which will be discussed in more detail below, upon the initially authorized device, with initial soft network subscription credentials, communicates with the service provider via the network and receives new soft network subscription credentials. The initially authorized device then transmits the new soft network subscription to the initially unauthorized device. The initial soft network subscription credentials may be rendered obsolete when the new soft network subscription credentials are created by the service provider. In such a scenario, the initially authorized device becomes unauthorized with communication with the network when the new soft network credentials are created.

Figure 5:
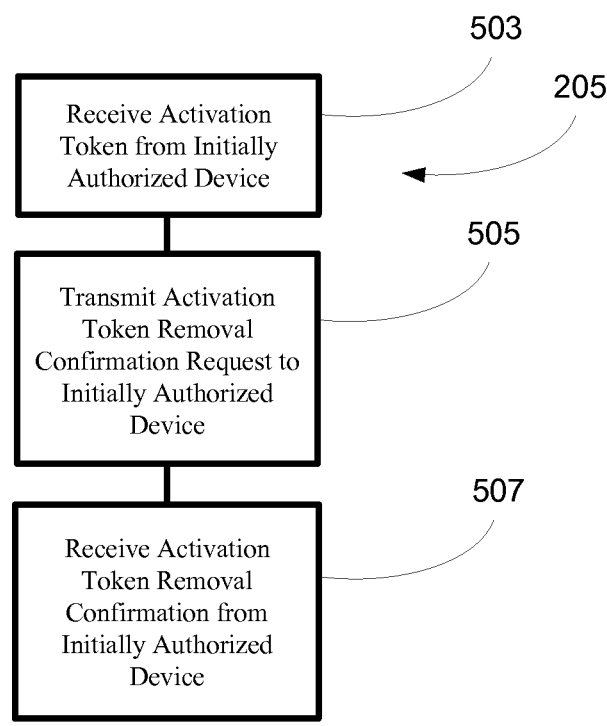
FIG. 5 illustrates one embodiment of a device initially unauthorized for communication with a network initiating a request for a persistent transfer of soft network subscription credentials in accordance with the invention.

Turning briefly to FIG. 5, illustrated therein is an alternate embodiment of a method for accomplishing the transmission of the activation request from the initially unauthorized device to the initially authorized device (i.e. an alternate method of accomplishing step 205 of FIG. 2). The method of FIG. 5 accomplishes the transmission of the activation request and the transmission of soft network credentials through a token-based system. In this embodiment, the initially unauthorized device receives an activation token from the initially authorized device at step 503. The activation token is different from the general acknowledgement message sent at step 211 of FIG. 2, as the activation token includes therein soft network subscription credentials. Once the activation token is transmitted, the initially authorized device deletes any cached copy of the activation token from memory.

At step 505, the initially unauthorized device then transmits an activation token removal confirmation request to the initially authorized device. In sending the activation token removal confirmation request to the initially authorized device, the initially unauthorized device seeks to verify that the activation token present in the initially authorized device has been deleted. This is done prior to the initially unauthorized device initiating communication with the network, so as to avoid the problem of two devices with the same device identifier or activation token information communicating with the network simultaneously.

After transmitting the activation token removal confirmation request, the initially unauthorized device receives an activation token removal confirmation from the initially authorized device at step 507. The activation token removal confirmation indicates that the initially authorized device has indeed deactivated its soft network subscription credentials and is therefore no longer authorized for communication with the network. Upon completion of the acknowledgement process, the initially unauthorized device activates its network communication interface and attempts to begin communication with the network.

Returning again to FIG. 2, upon the initially unauthorized device receiving the soft network subscription credentials and becoming authorized for communication with the network, in some situations the initially unauthorized device may initially still not be able to communicate with the network. In one embodiment for example, the initially unauthorized device may still need to activate a network interface configured for electronic communication with the network. The network interface may include communication hardware configured for electronic data transmission with the network. In such a scenario, illustrated at step 209, the initially unauthorized device may further commence an authentication process with the network. At step 210, the authentication process comprises an authentication and key agreement process. Authentication and key agreement processes are commonly used in 2G, 3G, 3G+, 801.1X networks, and many other networks.

Figure 6:
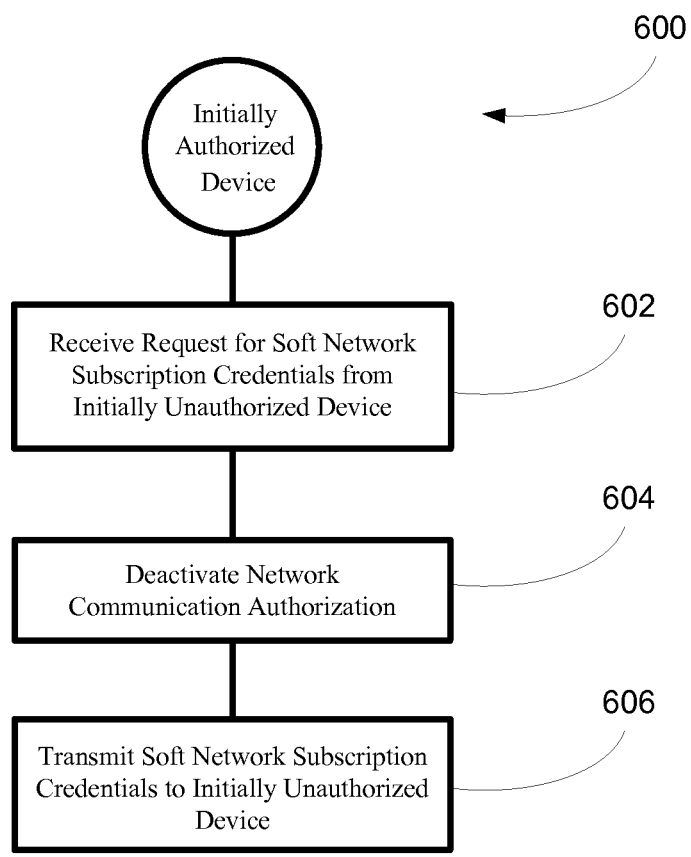
FIG. 6 illustrates one embodiment of a method for a transfer of soft network subscription credentials in accordance with the invention.

Turning now to FIG. 6, illustrated therein is one embodiment of a method 600 in an initially authorized device for a transfer of soft network subscription credentials to an initially unauthorized device. While the method of FIG. 2 illustrates embodiments of the invention from the perspective of the initially unauthorized device, FIG. 6 illustrates embodiments of the invention from the perspective of the initially authorized device.

At step 602, the initially authorized device receives a request for the soft network subscription credentials from the initially unauthorized device. As described earlier, the request for the soft network subscription credentials may comprise an activation request containing hardware dependent information, some of which may identify the initially unauthorized device. Alternatively, the activation request may identify the initially unauthorized device's subscriber relationship with the network.

Upon receiving the request for soft network subscription credentials, the initially authorized device deactivates its authorization for communication with the network at step 604. In one embodiment, deactivating the authorization for communication with the network involves removing the initially authorized device's soft network subscription credentials from memory and preparing to persistently transfer the soft network subscription credentials to a different device. At step 606, the initially authorized device then persistently transmits the soft network subscription credentials to the initially unauthorized device.

The transfer of the soft network subscription credentials, in one embodiment, occurs without interaction with a service provider. For instance, where the soft network subscription credentials used by the initially authorized device and the initially unauthorized device are the same, service provider involvement may be unnecessary. In other embodiments, the service provider is included in the transfer. For example, as mentioned above, the soft network subscription credentials used by the initially authorized device may be different from those delivered to the initially unauthorized device. As such, the service provider may be responsible for issuing these new soft network subscription credentials.

Figure 7:
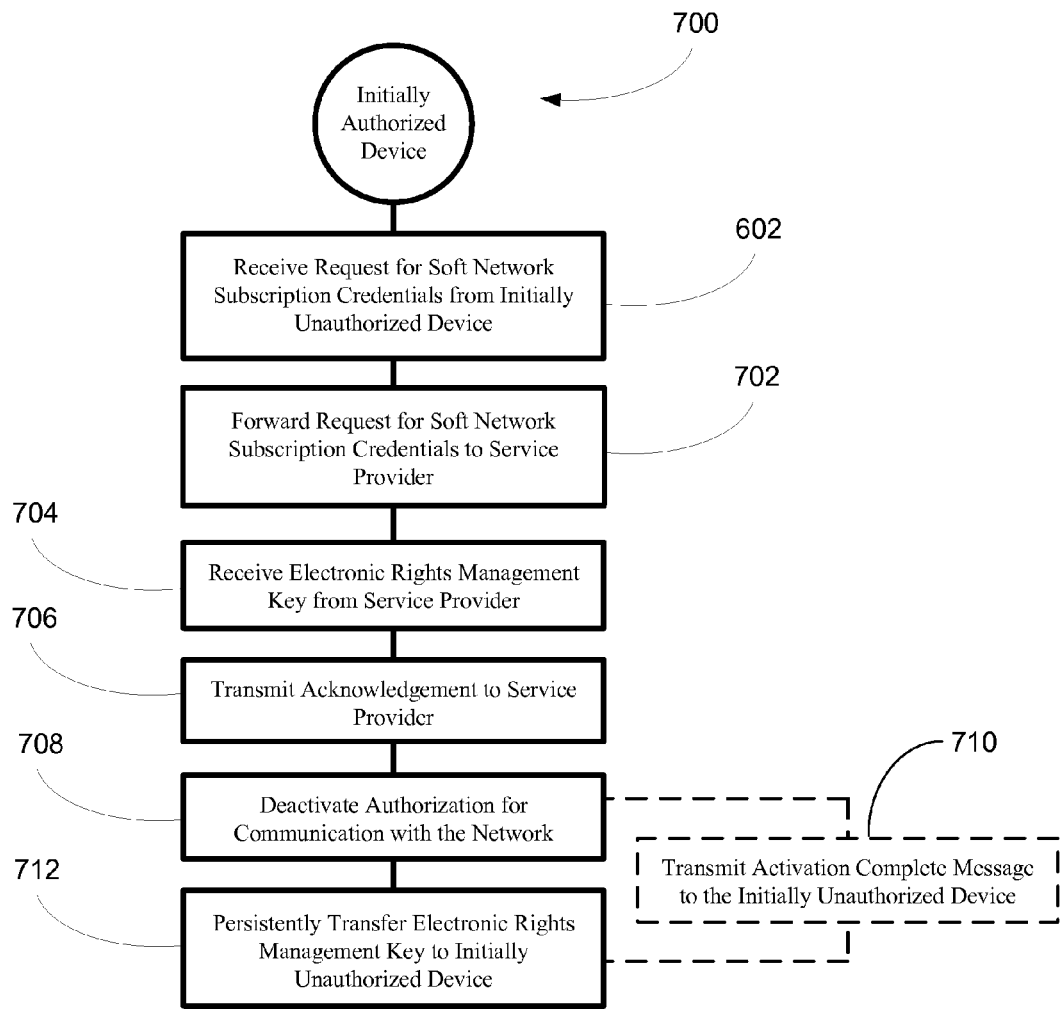
FIG. 7 illustrates one embodiment of a method for deactivating an authorization for communication with a network in accordance with the invention.

Turning to FIG. 7, illustrated therein is one embodiment of a method 700 of the initially authorized device deactivating its authorization for communication with the network. The method 700 is one in which a service provider is involved in the persistent transfer of soft network subscription credentials from the initially authorized device to the initially unauthorized device. Further, the method 700 employs digital rights management techniques to facilitate the transfer of the soft network subscription credentials. Such a method is advantageous when the service provider desires notification or confirmation that the transfer is occurring, or when a new set of soft network subscription credentials will be used by the initially unauthorized device. The service provider may, for example, create new soft network subscription credentials to persistently transfer to the initially unauthorized device. Where these new credentials differ from those already in possession by the initially authorized device, the initially authorized device may not need to delete or remove its soft network subscription credentials, as the new credentials will inherently invalidate the initially authorized device's initial soft network subscription credentials.

In one embodiment, at step 702, the initially authorized device transmits an electronic message comprising the activation request received from the initially unauthorized device to a service provider. The service provider, upon receiving the activation request from the initially unauthorized device, may then create a new set of soft network subscription credentials. In one embodiment, the soft network subscription credentials include an electronic rights management key. The initially authorized device then receives the electronic rights management key at step 704. The initially authorized device may transmit and acknowledgment to the service provider confirming receipt of the electronic rights management key at step 706.

At step 708, if it has not already been completed, the initially authorized device completes its deactivation with the network. Generally this step will be required in that the initially authorized device needs network communication capabilities to receive the electronic rights management key from the service provider. Where this is the case, the initially authorized device may optionally transmit a deactivation complete message to the initially unauthorized device at step 710. Where the initially authorized device receives a different soft network subscription credentials than the one previously stored in the initially authorized device, deactivation may occur automatically. Alternatively, where the same soft network subscription credentials are used, the initially authorized device may be required to delete its soft network subscription credentials before transmitting the activation complete message to the initially unauthorized device. Following deactivating authorization for communication with the network, the initially authorized device persistently transmits the soft network subscription credentials to the initially unauthorized device at step 712.

Figure 8:
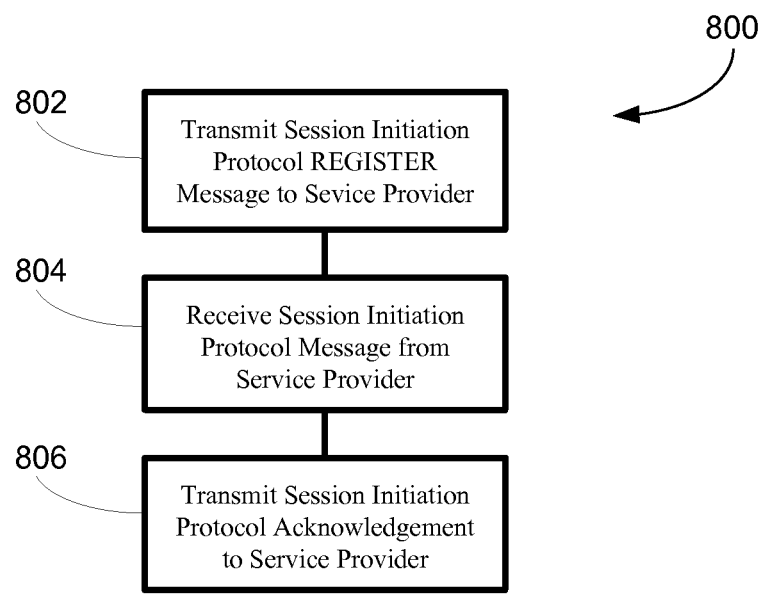
FIG. 8 illustrates one embodiment of a method of obtaining soft network subscription credentials from a service provider in accordance with the invention.

Turning now to FIG. 8, illustrated therein is an alternate embodiment of a method 800 for obtaining soft network subscription credentials from a service provider in accordance with the invention. In the method of FIG. 8, Session Initiation Protocol (SIP) messages are employed. SIP is an application-layer control protocol for creating, modifying, and terminating sessions with one or more participants. SIP is commonly used in 3G, 802.11.X, ATM, DTM, Ethernet, and many other data networks as a communication protocol.

At step 802, the initially authorized device transmits the activation request—received from the initially unauthorized device—to the service provider. This transmission may occur through the transmission of a SIP REGISTER message having the activation request stored within the body. Identifying information may also be stored in a service provider database such that the service provider may maintain a record of which devices are authorized to communicate with the network. The SIP REGISTER message may indicate that the initially authorized device is ready to begin a communication session with the service provider and also provide identifying information concerning the initially unauthorized device requesting activation.

The service provider, upon receiving the SIP REGISTER message from the initially authorized device, updates a device identifier in its subscriber database and then transmits a SIP message in return. The return message, in one embodiment, is a 200 OK SIP message. Upon receiving the 200 OK SIP message from the service provider at step 804, the initially authorized device may send a SIP ACK message to the service provider at step 806. Upon receiving the SIP ACK message, the service provider permanently updates the device identifier and deactivates the initially authorized device. If the SIP ACK message is not received within a predetermined time, the service provider retransmits the 200 OK SIP message.

Method 800, as shown in FIG. 8, illustrates only one embodiment of the invention that utilizes SIP messaging. As discussed above, SIP communication enables the initially authorized device to communicate with the service provider to facilitate the activation request. Note, however, that SIP communication may also be utilized in an embodiment of the invention in which the service provider is absent.

In one embodiment, the initially unauthorized device packs a SIP REGISTER message into the activation request sent to the initially authorized device. The initially authorized device in response transmits the 200 OK SIP message to the initially unauthorized device acknowledging the receipt of the activation request. In one embodiment, SIP communication may also be used to facilitate confirmation for the initially unauthorized device that the initially authorized device has immutably deactivated authorization for communication with the network. In another embodiment, SIP communication may be used to facilitate the termination of the communication session between the initially unauthorized device and the initially authorized device following the persistent transfer of the soft network subscription credentials.

Figure 9:
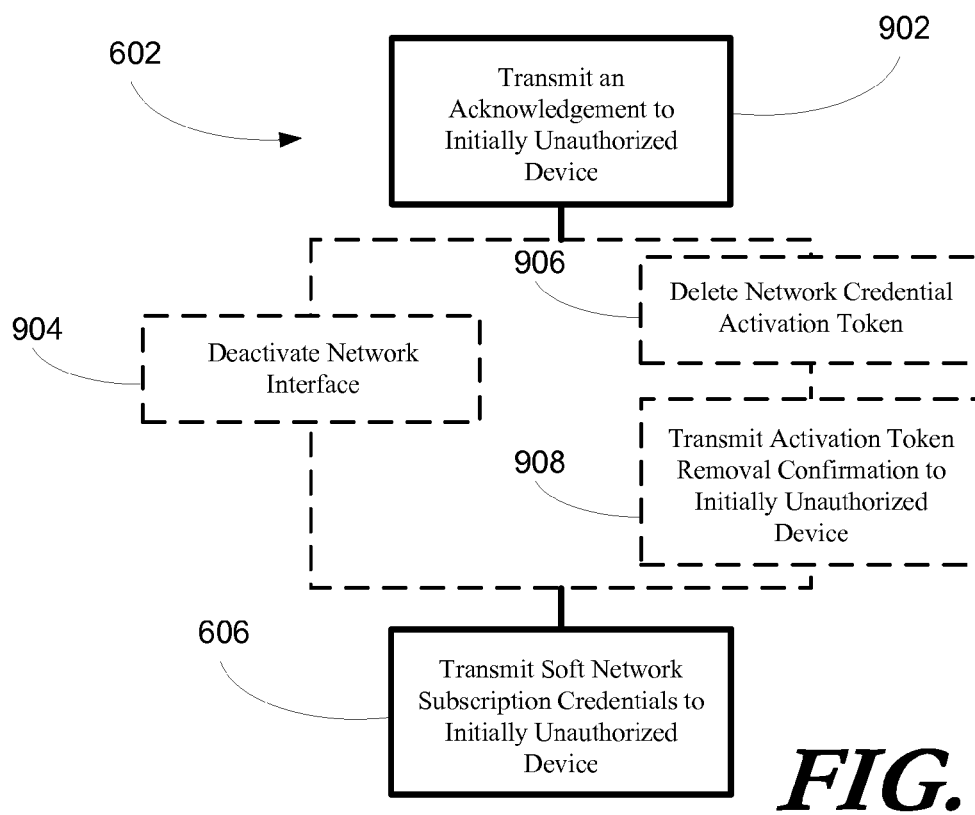
FIG. 9 illustrates one embodiment of a receiving a request for soft network subscription credentials from a device initially unauthorized for communication with a network in accordance with the invention.

Turning now to FIG. 9, illustrated therein is an alternate embodiment of a method for obtaining soft network subscription credentials from a service provider in accordance with the invention. In the method of FIG. 9, which occurs without service provider participation, a token-based system is used as an illustrative embodiment.

An optional acknowledgement, similar to the acknowledgement of step 211 in FIG. 2, is transmitted the initially unauthorized device in response to the receiving the request for the soft network subscription credentials at step 902. Following the transmitting of the acknowledgement to the initially unauthorized device, at step 904 the initially authorized device deactivates its network interface so as to end communication with the network. The initially authorized device then persistently transmits the soft network subscription credentials to the initially unauthorized device at step 606.

In one embodiment, the acknowledgment process may be implemented using tokens. In such an embodiment, for example following step 902, the initially authorized device may immutably delete a network credential activation token located in a memory at step 906. "Immutably deleting" means that no back-up or cached copy of the token is retained—once the token is gone, it is purged and cannot be recalled. In one embodiment, the network credential activation token is embedded within the soft network subscription credentials. In one embodiment, the initially authorized device need only to delete the network credential activation token to deactivate the communication authorization, as opposed to deleting its soft network subscription credentials.

Following the deletion of the network credential activation token, in one embodiment, the initially authorized device may transmit an activation token removal confirmation to the initially unauthorized device at step 908. The activation token removal confirmation indicates that the initially authorized device has deleted the network credential activation token and is therefore no longer able to communication with the network. Following the transmission of the activation token removal confirmation, the initially authorized device may persistently transmit the soft network subscription credentials to the initially unauthorized device at step 606.

Figure 10:
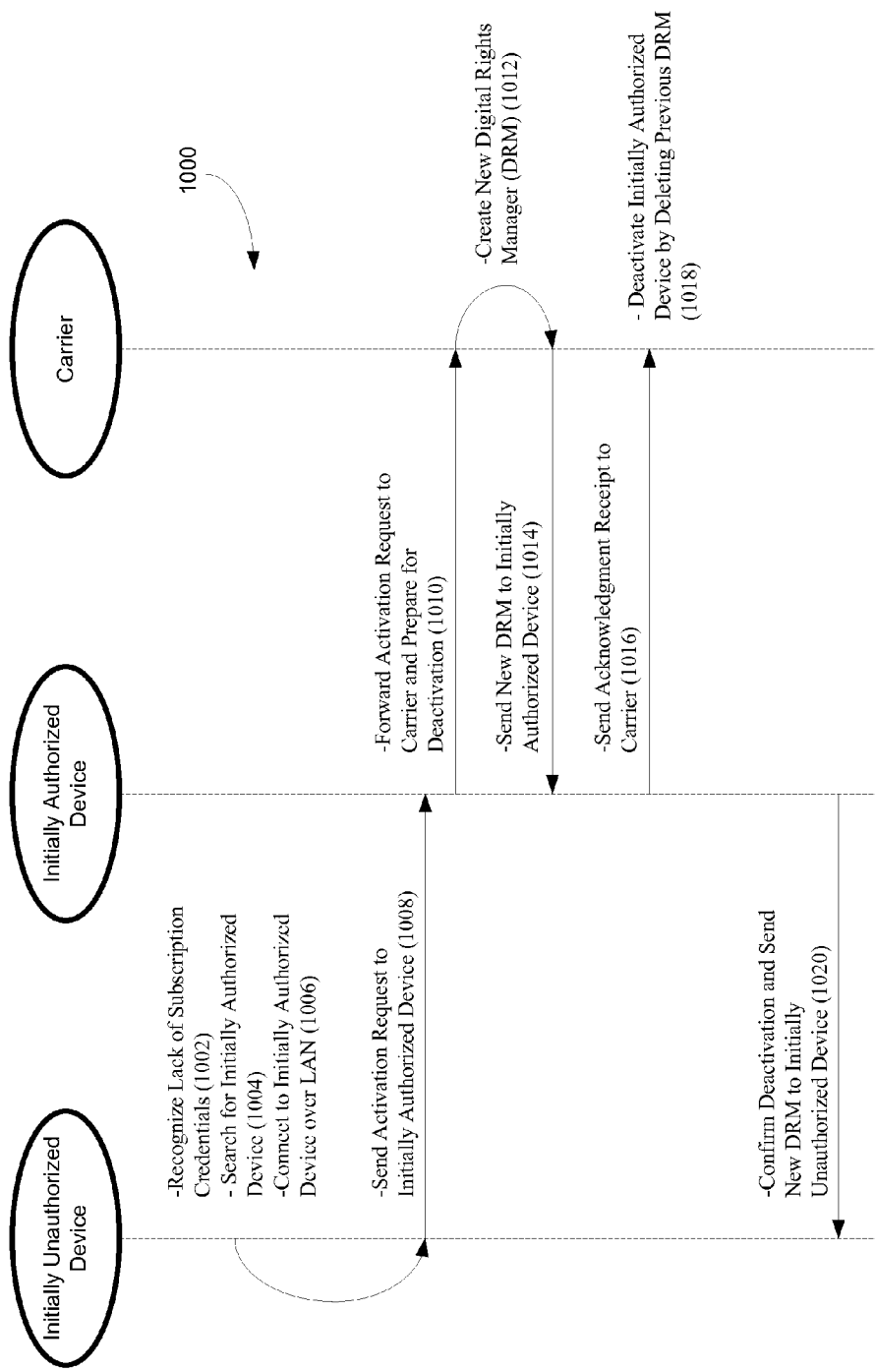
FIG. 10 illustrates one embodiment a method for a device initially unauthorized for communication with a network to obtain soft network subscription credentials from a device initially authorized for communication with a network in accordance with the invention.

Turning to FIG. 10, illustrated therein is another embodiment of the invention showing a method 1000 for an initially unauthorized device to obtain valid subscription credentials from an initially authorized device. The embodiment of FIG. 10 includes interaction with the service provider. In one embodiment, both the initially authorized device and the initially unauthorized device have identical SIM information. This SIM information may be stored in either physical SIM cards or electronic "soft" SIMs. Each device may also include digital rights management (DRM) algorithms for protecting the SIM information.

At step 1002, the initially unauthorized device recognizes its lack of subscription credentials. At step 1004, the initially unauthorized device initiates a search to find the initially authorized device using one of the device searching methods as discussed earlier. The initially unauthorized device, upon finding the initially authorized device, connects the initially authorized device over a local area network (LAN) at step

1006. The LAN, as used herein, refers to communication between the initially unauthorized device and the initially authorized device, while a wide area network (WAN) refers to communication between the initially authorized or initially unauthorized device and the network or the service provider.

At step 1008, the initially unauthorized device sends an activation request to the initially authorized device over the LAN. As noted above, in one embodiment the activation request comprises hardware-dependent information, such as an international mobile equipment identifier. The initially authorized device, upon receiving the activation request from the initially unauthorized device, transmits the activation request to the service provider over a WAN and prepares itself for deactivation at step 1010. The service provider, at step 1012, creates new DRM key. The service provider then sends the new DRM key to the initially authorized device at step 1014. At step 1016, the initially authorized device sends an acknowledgement of receiving the new DRM key to the service provider. When the acknowledgement is received, the service provider deletes the previous DRM key, thereby deactivating the initially authorized device's authorization for communication with the service provider's network at step 1018. In one embodiment, if the acknowledgement is not received, method 1000 returns to step 1014. At step 1020, when initially authorized device confirms that it can no longer access the network, the previously initially authorized device transmits the new DRM key to the initially unauthorized device.

Figure 11:
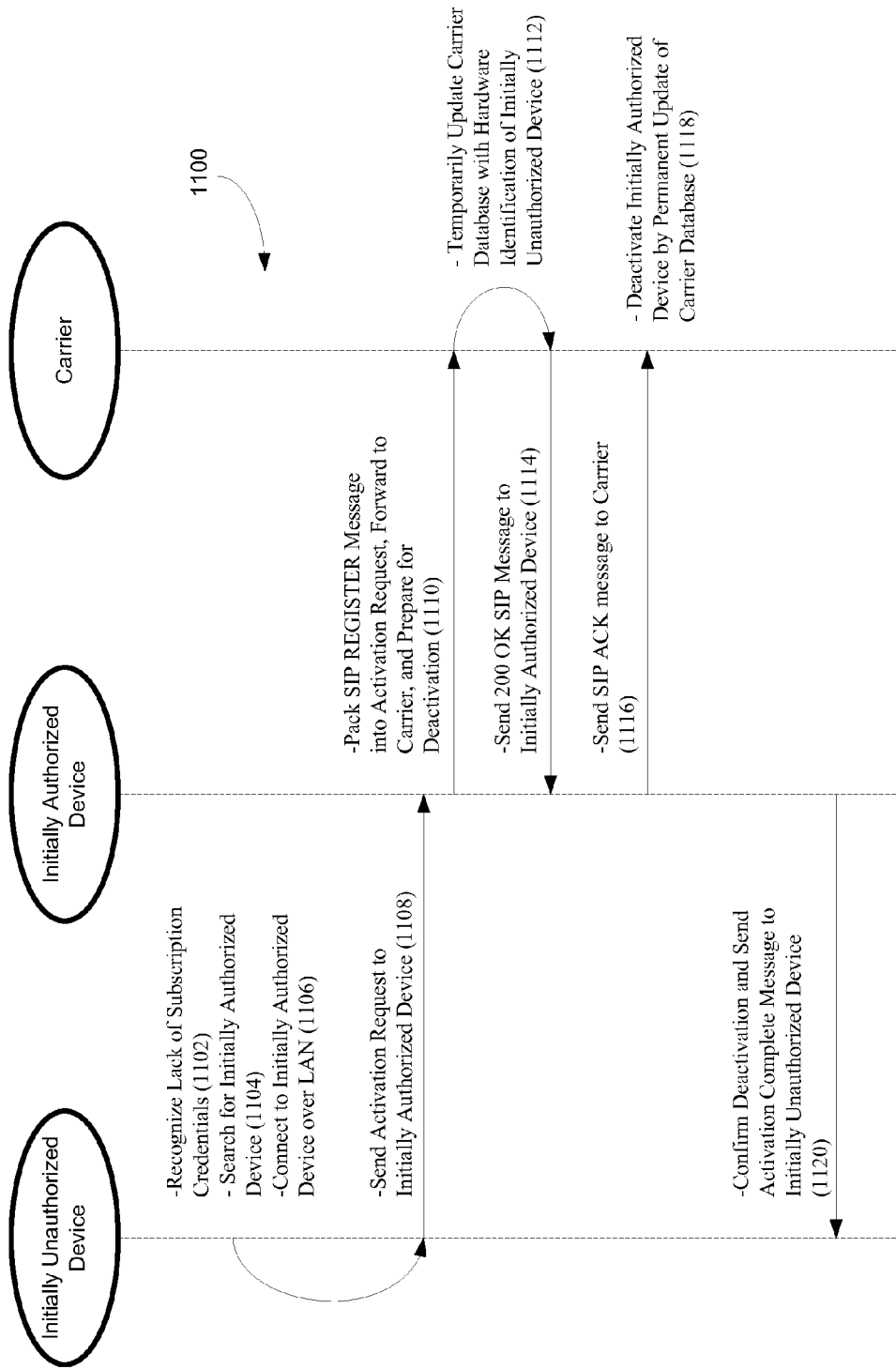
FIG. 11 illustrates one embodiment of a method for a device initially unauthorized for communication with a network to obtain soft network subscription credentials from a device initially authorized for communication with a network in accordance with the invention.

Turning to FIG. 11, illustrated therein is another embodiment of the invention showing a method 1100 for an initially unauthorized device to obtain valid subscription credentials from an initially authorized device. This embodiment involves the interaction with the service provider. The initially authorized device and the initially unauthorized device may have identical SIM information, either physical SIM cards or electronic "soft" SIMs. Further, the service provider may have a service provider database with a data field for a hardware identifier corresponding to the unique hardware identifier of the initially authorized device.

At step 1102, the initially unauthorized device recognizes its lack of subscription credentials. At step 1104, the initially unauthorized device initiates a search to find the initially authorized device using one of the device searching methods as discussed earlier. The initially unauthorized device, upon finding the initially authorized device, connects the initially authorized device over a LAN at step 1106.

At step 1108, the initially unauthorized device sends an activation request to the initially authorized device over the LAN. In one embodiment the activation request comprises hardware-dependent information, such as an international mobile equipment identifier. The initially authorized device, upon receiving the activation request from the initially unauthorized device, packs the activation request into the body of a SIP REGISTER message, transmits the SIP REGISTER message to the service provider over a WAN, and prepares for deactivation at step 1110. The service provider, at step 1112, detects the request for activation payload in the SIP REGISTER message and temporarily updates the service provider database with hardware identification of the initially unauthorized device. The service provider then sends a SIP 200 OK message to the initially authorized device at step 1114 indicating that the service provider is has performed the updating task and is ready for an acknowledgment before finishing the procedure.

At step 1116, the initially authorized device sends SIP ACK message confirming receipt of the SIP 200 OK. When the SIP ACK message is received, the service provider permanently updates service provider database with hardware identification of the initially unauthorized device and therein replacing the initially authorized device's hardware identification and thus deactivating the initially authorized device for communication with the service provider's network at step 1118. In one embodiment, if the SIP ACK is not received, method 1100 returns to step 1114. At step 1120, when initially authorized device confirms that it can no longer access the network, the previously initially authorized device persistently transmits an "activation complete" message to the initially unauthorized device.

Figure 12:
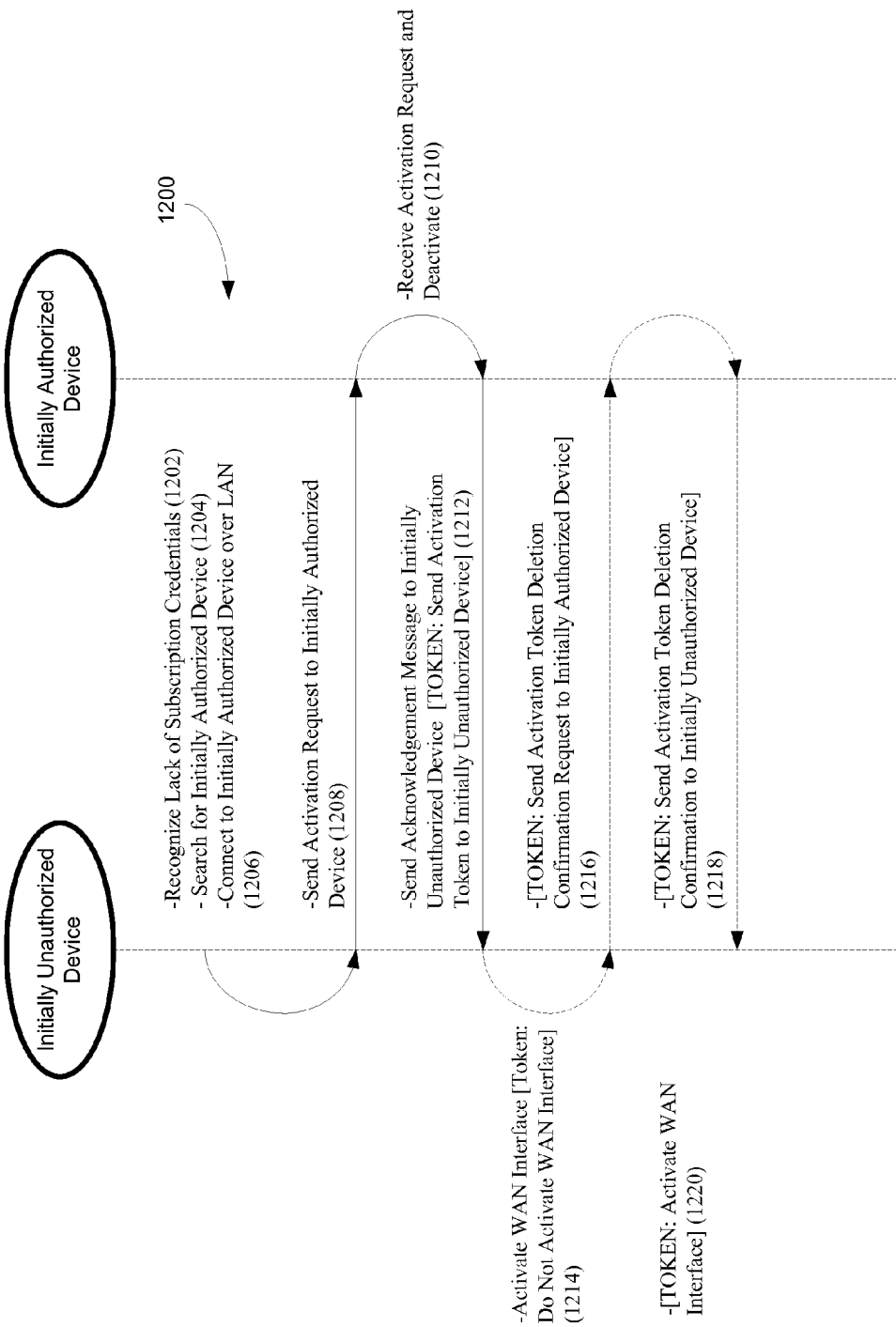
FIG. 12 illustrates one embodiment of the invention showing a method 1200 for an initially unauthorized device to obtain valid subscription credentials from an initially authorized device having valid subscription credentials for a service provider's communication network.

Turning to FIG. 12, illustrated therein is another embodiment of the invention showing a method 1200 for an initially unauthorized device to obtain valid subscription credentials from an initially authorized device. This embodiment does not involve the interaction with the service provider. As with the embodiments of FIGS. 10 and 11, the initially authorized device and the initially unauthorized device may have identical SIM information, either physical hardware SIM cards or electronic "soft" SIMs.

At step 1202, the initially unauthorized device recognizes its lack of subscription credentials as described earlier. At step 1204, the initially unauthorized device initiates a search to find the initially authorized device using one of the searching methods as discussed earlier. The initially unauthorized device upon finding the initially authorized device communicates with the initially authorized device by way of a LAN connection at step 1206.

At step 1208, the initially unauthorized device sends an activation request to the initially authorized device over the LAN. The initially authorized device, upon receiving the activation request from the initially unauthorized device notes the request and deactivates its interface with the WAN at step 1210. The initially authorized device, at step 1212, transmits an acknowledgement message and an activation token to the initially unauthorized device. In one embodiment, the activation token is used to indicate to the device it is present in that that device is authorized for communication with the network. At step 1214, the initially unauthorized device activates its WAN interface thus enabling communication with the network.

In one embodiment, a token based confirmation step may be implemented to ensure that the initially authorized device has indeed deactivated itself from the WAN. At step 1216, upon receiving the activation token from the initially authorized device, the initially unauthorized device transmits a request to verify that the activation token has been deleted from the initially authorized device's memory. If the activation token has been deleted, the initially authorized device transmits a reply to the initially unauthorized device stating that the activation token has been removed at step 1218. If the initially unauthorized device receives a confirmation message from the initially authorized device stating that the initially authorized device's activation token has been deleted, at step 1220 the initially unauthorized device activates its WAN interface thus enabling communication with the network.

Figure 13:
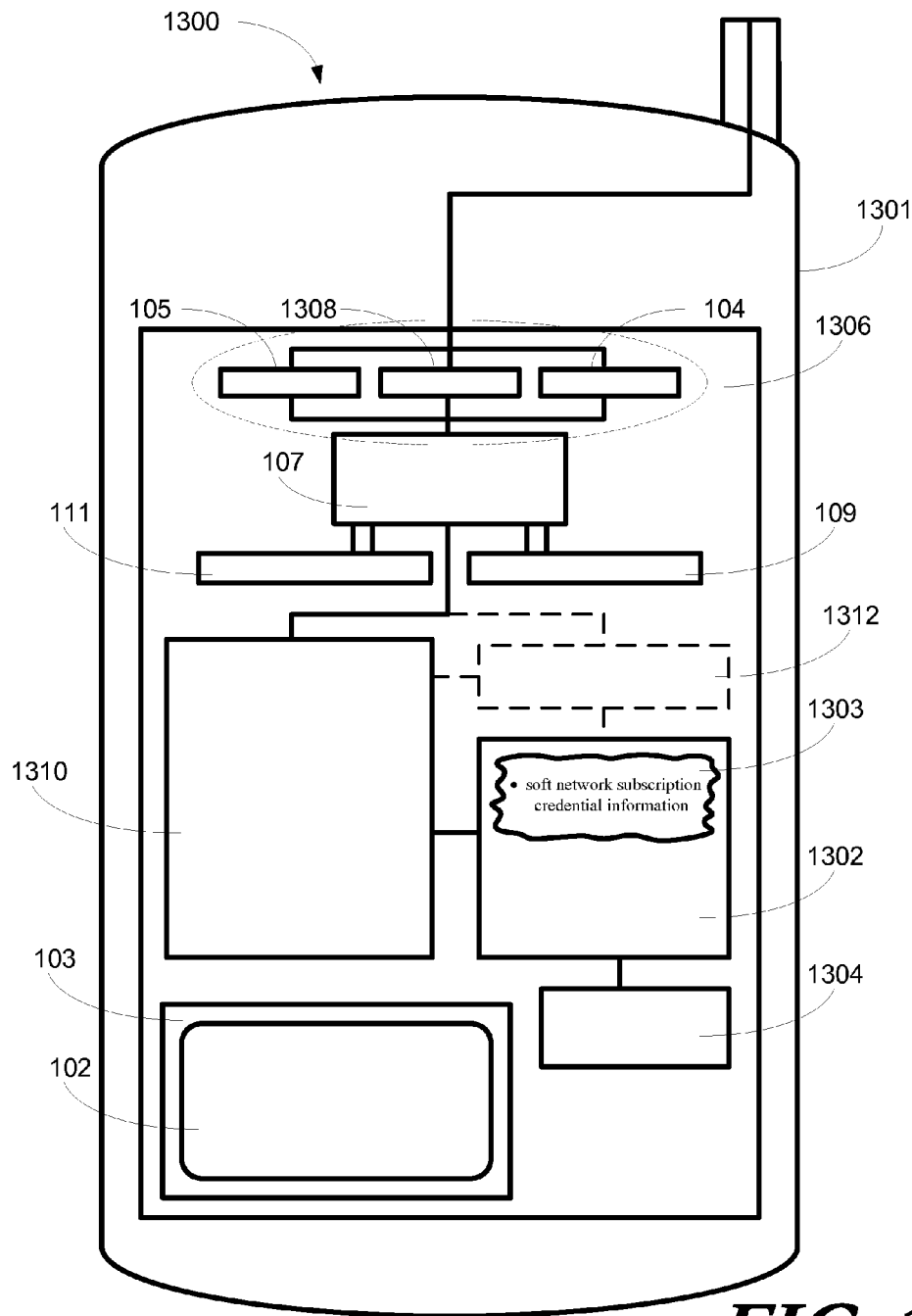
FIGS. 13 and 14 illustrate embodiments of portable electronic devices in accordance with the invention.
Figure 14:
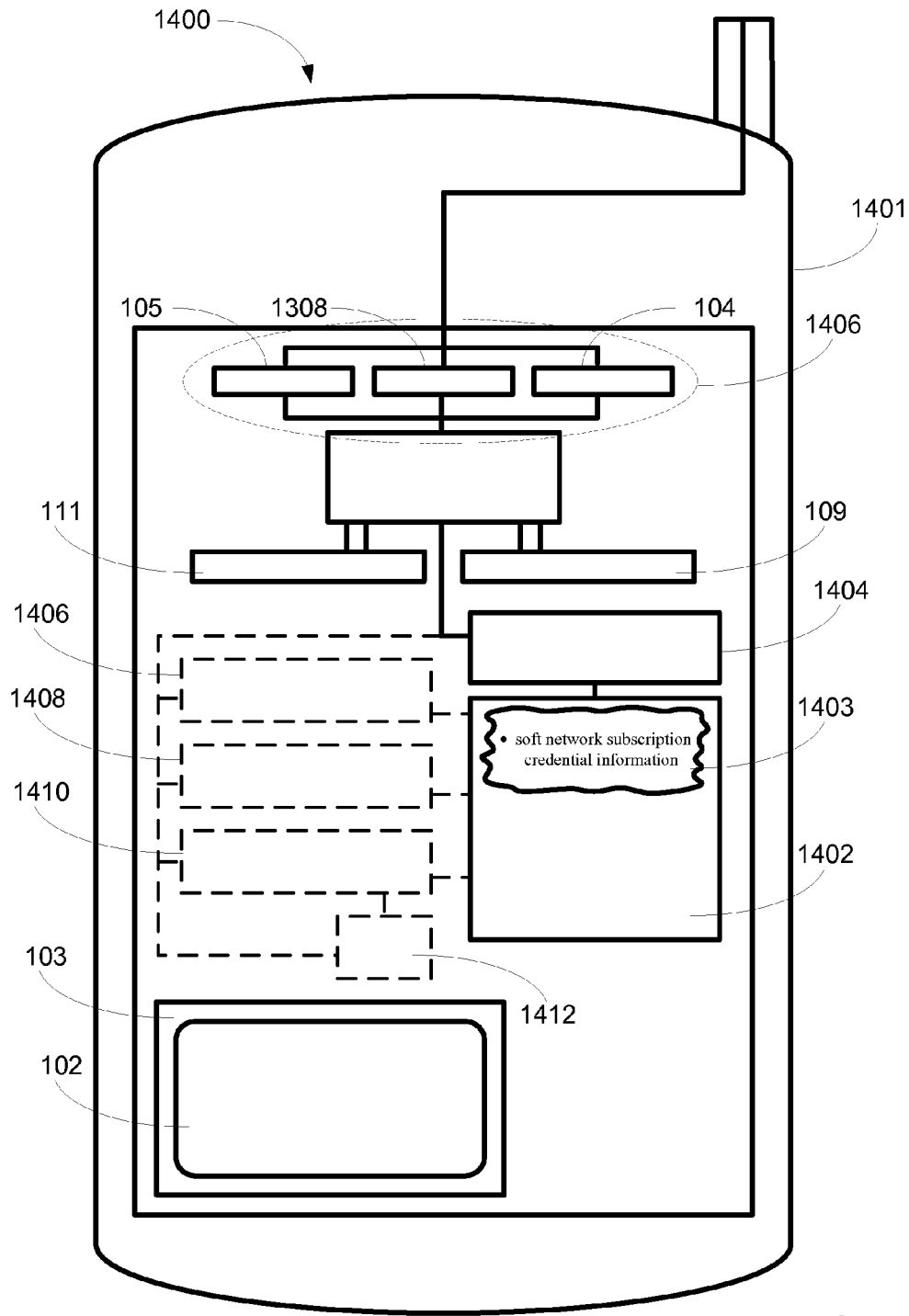

Briefly discussing FIGS. 13 and 14, illustrated therein are two embodiments of a soft network subscription credential transfer module for use in a wireless communication device in accordance with the invention. The embodiments of FIG. 13 and FIG. 14 illustratively include prior art elements such as a hard SIM Card 102, a hard SIM card holder 103, a transmitter 104, a receiver 105, a controller 107, a user interface 109, and a hard SIM card reader 111. The presence of the prior art elements is not necessary, however. For example, in one embodiment of the invention, the wireless communication device is void of the hard SIM Card 102, the hard SIM card holder 103, and the hard SIM card reader 111.

Turning first to FIG. 13, illustrated therein is one embodiment of a soft network subscription credential transfer module 1300 in a wireless communication device 1301. The soft network subscription credential transfer module 1300 allows the wireless communication device 1301, initially unauthorized for communication with a network, to obtain soft network subscription credential information 1302 from a wireless communication device initially authorized for communication with a network.

In one embodiment, the soft network subscription credential transfer module 1300 comprises a non-volatile storage device 1302. Examples of non-volatile storage devices include read-only memory, flash memory, and magnetic computer storage devices such as hard disks and floppy disk, and optical disks. The non-volatile storage device 1302 may be connected to the controller 107, which in turn facilitates the processes of each attached element.

In one embodiment, the non-volatile storage device 1302 is configured to selectively and persistently store soft network subscription credential information. In persistently storing the soft network subscription credential information 1303, the non-volatile storage device 1302 is able to retain the soft network subscription credential information 1303 following its receipt from another device after a communication link with that device has been severed. For example, in one embodiment, an initially unauthorized device persistently stores the soft network subscription credentials in the non-volatile storage device 1302. Upon severing of the LAN communication link between the two phones, the soft network subscription credentials remain stored in the initially unauthorized device. The initially unauthorized device can only remove the soft network subscription credentials when it actively transfers or deletes them itself. The soft network subscription credentials may not be removed from the non-volatile storage device 1302 by the severing of the communication link with the initially authorized device.

In one embodiment, the soft network subscription credential transfer module 1300 may comprise a network subscription credential detector 1304. The network subscription credential detector 1304, using methods that would be known in the art such as DRM, is be configured to detect a presence of active network subscription credential information in the non-volatile storage device 1302.

In one embodiment, the soft network subscription credential transfer module 1300 comprises electronic communication circuitry 1306. The electronic communication circuitry is configured to search for, and communicate with, other wireless devices. The electronic communication circuitry 1306 may also be configured to communicate with the network. In one embodiment, the electronic communication circuitry 1306 may comprise a transmitter 104 and a receiver 105 which enable the electronic communication circuitry 1306 to communicate with the network over a wide area network, and the electronic communication circuitry 1306 may comprise a local area network communication device 1308 which may allow communication to the wireless communication device initially authorized for communication with a network.

The soft network subscription credential transfer module 1300 may further include an activation module 1310. Upon receiving the soft network subscription credentials from the wireless communication device initially authorized for communication with the network, the activation module 1310 may activate the soft network subscription credential information 1303 and initiate communication with the network. In one embodiment, activating soft network subscription credential information 1303 may also activate a wide area network interface of the electronic communication circuitry 1306. In another embodiment, activating soft network subscription credential information 1303 may initiate an authentication process between the wireless communication device and the network.

In one embodiment, the soft network subscription credential transfer module 1300 comprises a token management module 1312. The process of utilizing tokens for determining persistent activation of a device as been explained above. In one embodiment, the token management module 1312 may be configured to receive an activation token from a remote device and to persistently store the activation token in the non-volatile storage device 1302. The remote device may be the wireless communication device initially authorized for communication with a network.

Turning to FIG. 14, illustrated therein is one embodiment of a soft network subscription credential transfer module 1400 in a wireless communication device 1401. The soft network subscription credential transfer module 1400 allows a wireless communication device 1401, initially authorized for communication with a network, to transmit soft network subscription credentials to a wireless communication device initially unauthorized for communication with a network.

In one embodiment, the soft network subscription credential transfer module 1400 comprises a non-volatile storage device 1402. The non-volatile storage device 1402 may be configured to selectively and persistently store the soft network subscription credential information 1403. The soft network subscription credential transfer module 1400 may receive the soft network subscription credential information 1403 from the service provider.

In one embodiment, the soft network subscription credential transfer module 1400 comprises an electronic rights manager 1406. The electronic rights manager 1406 may be configured to receive an electronic rights management key from the service provider, and to forward the electronic rights management key to the wireless communication device initially unauthorized for communication with the network.

In one embodiment, the soft network subscription credential transfer module 1400 comprises electronic communication circuitry 1306. The electronic communication circuitry 1306 is configured to listen for, and communicate with a wireless communication device initially unauthorized for communication with a network. The electronic communication circuitry 1306 may also be configured to communicate with the network. In one embodiment, the electronic communication circuitry 1306 may comprise a transmitter 104 and a receiver 105 which enable the electronic communication circuitry 1306 to communicate with the network over a wide area network. The electronic communication circuitry 1306 may comprise a local area network communication device 1308 as well.

In one embodiment, the soft network subscription credential transfer module 1400 comprises a deactivation module 1404. The deactivation module 1404 may be configured to immutably deactivate the soft network subscription credential information 1403. Immutably deactivating the soft network subscription credential information 1403 involves removing the entire soft network subscription credential information 1403 from the non-volatile storage device 1402. In another embodiment, it may involve removing enough data from the soft network subscription credential information 1403 as to render the soft network subscription credential transfer module 1400 inoperable of communicating with the network.

In one embodiment, the soft network subscription credential transfer module 1400 copies the soft network subscription credential information 1403 to a temporary memory location for later transmission and then proceeds to deactivate the soft network subscription credential information 1403 from the non-volatile storage device 1402. The soft network subscription credential information 1403 once placed in the temporary memory location must be sent to the electronic communication circuitry 1306 for transmission to the wireless communication device initially unauthorized for communication with a network and may not return the soft network subscription credential information 1403 to the non-volatile storage device 1402. Upon the immutably deactivation of the soft network subscription credential information 1403, the electronic communication circuitry 1306 is configured to transmit the soft network subscription credential information 1403 to the wireless communication device initially unauthorized for communication with a network.

In one embodiment, the soft network subscription credential transfer module 1400 further comprises a SIP communication module 1408. The SIP communication module 1408 is configured to transmit and receive SIP communication messages.

In one embodiment, the soft network subscription credential transfer module 1300 may utilize tokens to confirm the deactivation of the soft network subscription credential information 1303. In one embodiment of token utilization, soft network subscription credential transfer module 1300 comprises an activation module 1310. The activation module 1310 is configured to immutably delete a network credential activation token prior to the electronic communication circuitry transmitting the soft network subscription credentials. The possession of the network credential activation token indicates that the soft network subscription credential transfer module 1300 has not deactivated the soft network subscription credential information 1303.

In one embodiment, the soft network subscription credential transfer module 1300 further comprises a token management module 1312 configured to verify that the network credential activation token has been immutably deleted. If the token management module 1312 confirms the immutable deletion of the network credential activation token, it may implement the electronic communication circuitry to transmit an activation token removal confirmation to the wireless communication device initially unauthorized for communication with the network.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A method in a wireless communication device initially unauthorized for communication with a network for obtaining persistent soft network subscription credentials from a wireless communication device initially authorized for communication with the network, the method comprising:

detecting an absence of the soft network subscription credentials in the wireless communication device initially unauthorized for communication with the network;

electronically searching for the wireless communication device initially authorized for communication with the network;

initiating a request for a persistent transfer of the soft network subscription credentials by transmitting an activation request to the wireless communication device initially authorized for communication with the network;

receiving an activation token from the wireless communication device initially authorized for communication with the network in response to the transmitting the activation request; and upon the wireless communication device initially authorized for communication with the network deactivating its communication authorization, receiving a soft network subscription credentials from the wireless communication device initially authorized for communication with the network.

2. The method of claim 1, further comprising authorizing the wireless communication device initially unauthorized for communication with the network to communicate with the network.

3. The method of claim 1, wherein the soft network subscription credentials comprise information capable of identifying a network associated with a service provider.

4. The method of claim 1, wherein the soft network subscription credentials comprise a user identification module.

5. The method of claim 4, wherein the user identification module comprises a subscriber identification module.

6. The method of claim 4, wherein the user identification module comprises an international mobile equipment identifier.

7. The method of claim 4, wherein the user identification module comprises an international mobile subscriber identification.

8. The method of claim 7, wherein at least a portion of the international mobile subscriber identification comprises a home public land mobile network identifier.

9. The method of claim 1, wherein transmitting the activation request comprises transmitting a device identifier associated with the wireless communication device initially unauthorized for communication with the network.

10. The method of claim 9, wherein the device identifier comprises one if an international mobile equipment identifier or a secure electronic certificate.

11. The method of claim 1, further comprising initiating an authentication process with the network.

12. The method of claim 11, wherein the authentication process comprises an authentication and key agreement process.

13. The method of claim 1, further comprising receiving an acknowledgement message from the wireless communication device initially authorized for communication with the network in response to the transmitting the activation request.

14. The method of claim 13, further comprising activating a network interface configured for electronic communication with the network.

15. The method of claim 1, further comprising transmitting an activation token removal confirmation request to the wireless communication device initially authorized for communication with the network and receiving an activation token removal confirmation.

16. The method of claim 15, further comprising activating a network interface configured to communicate with the network.

17. A method in a wireless communication device initially authorized for communication with a network for a transfer of soft network subscription credentials to a wireless communication device initially unauthorized for communication with the network, the method comprising:
   receiving a request for the soft network subscription credentials, the request comprising an activation request, from the wireless communication device initially unauthorized for communication with the network;
   transmitting an electronic message comprising the activation request to a service provider;
   receiving an electronic rights management key from the service provider; immutably deactivating an authorization for communication with the network;
   transmitting a soft network subscription credentials to the wireless communication device initially unauthorized for communication with the network.

18. The method of claim 17, further comprising transmitting an acknowledgement to the service provider upon completing the receiving the electronic rights management key.

19. The method of claim 17, wherein the transmitting the soft network subscription credentials comprises transmitting an electronic rights management key.

20. The method of claim 18, wherein the transmitting the electronic message comprising the activation request comprises transmitting a session initiation protocol REGISTER message having the activation request stored therein.

21. The method of claim 20, further comprising receiving a session initiation protocol message from the service provider.

22. The method of claim 21, wherein the session initiation protocol message comprises a 200 OK message.

23. The method of claim 21, further comprising transmitting a session initiation protocol acknowledgement to the service provider.

24. The method of claim 23, further comprising transmitting an activation complete message to the wireless communication device initially unauthorized for communication with the network upon immutably deactivating the authorization for communication with the network.

25. The method of claim 17, further comprising transmitting an acknowledgement to the wireless communication device initially unauthorized for communication with the network in response to receiving the request for the soft network subscription credentials.

26. The method of claim 25, further comprising deactivating a network interface in the wireless communication device initially authorized to communicate with the network.

27. The method of claim 25, further comprising immutably deleting a network credential activation token in the wireless communication device initially authorized to communicate with the network.

28. The method of claim 27, further comprising transmitting an activation token removal confirmation to the wireless communication device initially unauthorized for communication with the network.

29. A soft network subscription credential transfer module in a wireless communication device, comprising:
   a non-volatile storage device configured to selectively and persistently store soft network subscription credential information;
   a network subscription credential detector configured to detect a presence of active network subscription credential information in the non-volatile storage device;
   electronic communication circuitry configured to search for a wireless communication device initially authorized for communication with a network, wherein the electronic communication circuitry is further configured to transmit an activation request to the wireless communication device initially authorized for communication with the network; and
   an activation module configured to, upon receiving a soft network subscription credentials from the wireless communication device initially authorized for communication with the network, to activate the soft network subscription credential information;
   wherein the activation module remains active when a communication link between the electronic communication circuitry and the wireless communication device initially authorized for communication with the network is severed.

30. The module of claim 29, wherein the network is one or more of analog cellular networks, GSM networks, CDMA networks, TDMA networks, iDEN networks, WiMAX networks, or UMTS networks.

31. The module of claim 29, wherein the activation module is further configured to activate a wide area network interface of the electronic communication circuitry upon activation of the soft network subscription credential information.

32. The module of claim 29, further comprising a token management module configured to receive an activation token from a remote device and to persistently store the activation token in the non-volatile storage device.

33. A soft network subscription credential transfer module in a wireless communication device, comprising:
   a non-volatile storage device configured to selectively and persistently store soft network subscription credential information;
   electronic communication circuitry configured to receive requests for soft network subscription credential transfers; and
   a deactivation module configured to immutably deactivate the soft network subscription credential information;
   an electronic rights manager configured to receive an electronic rights management key from a service provider, and to forward the electronic rights management key to the wireless communication device initially unauthorized for communication with the network;
   wherein the electronic communication circuitry is configured to transmit a soft network subscription credentials to a wireless communication device initially unauthorized for communication with a network.

34. The module of claim 33, further comprising a session initiation protocol communication module configured to transmit and receive session initiation protocol communication messages and an activation token manager configured to immutably delete a network credential activation token prior to the electronic communication circuitry transmitting the soft network subscription credentials.

35. The module of claim 34, further comprising a token deletion verification manager configured to verify that the network credential activation has been immutably deleted, and to cause the electronic communication circuitry to transmit an activation token removal confirmation to the wireless communication device initially unauthorized for communication with the network.

* * * * *